(12) United States Patent
Wright et al.

(10) Patent No.: US 7,802,883 B2
(45) Date of Patent: Sep. 28, 2010

(54) COSMETIC CONTACT LENSES HAVING A SPARKLE EFFECT

(75) Inventors: Dawn D. Wright, St. Augustine, FL (US); Diana Zanini, Jacksonville, FL (US); Kanda Kumar Balasubramanian, St. Augustine, FL (US); Terry L. Spaulding, Jacksonville, FL (US); Douglas L. Evans, Jacksonville, FL (US); Jeffrey H. Roffman, St. Johns, FL (US); Karin D. McCarthy, Jacksonville Beach, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 12/337,859

(22) Filed: Dec. 18, 2008

(65) Prior Publication Data

US 2009/0190091 A1 Jul. 30, 2009

Related U.S. Application Data

(60) Provisional application No. 61/015,216, filed on Dec. 20, 2007.

(51) Int. Cl.
G02C 7/04 (2006.01)
(52) U.S. Cl. .................................................. 351/162
(58) Field of Classification Search ................. 351/162
See application file for complete search history.

(56) References Cited

U.S. PATENT DOCUMENTS

| | | | |
|---|---|---|---|
| 4,601,545 A | 7/1986 | Kern | |
| 4,697,070 A | 9/1987 | Kai | |
| 4,697,598 A | 10/1987 | Bernard | |
| 4,801,198 A | 1/1989 | Heacock | |
| 4,874,235 A | 10/1989 | Webster | |
| 4,889,421 A * | 12/1989 | Cohen | ......... 351/162 |
| 5,011,276 A | 4/1991 | Iwamoto | |
| 5,028,109 A | 7/1991 | Lawandy | |
| 5,029,220 A | 7/1991 | Juday | |
| 5,066,301 A | 11/1991 | Wiley | |
| 5,073,021 A | 12/1991 | Marron | |
| 5,108,169 A | 4/1992 | Mandell | |
| 5,108,427 A | 4/1992 | Majercik | |
| 5,108,429 A | 4/1992 | Wiley | |
| 5,123,726 A | 6/1992 | Webster | |
| 5,158,718 A | 10/1992 | Thakrar | |
| 5,171,266 A | 12/1992 | Wiley | |
| 5,187,269 A | 2/1993 | Shiraishi | |
| 5,203,788 A | 4/1993 | Wiley | |
| 5,233,373 A | 8/1993 | Peters | |
| 5,297,554 A | 3/1994 | Glynn | |
| 5,307,097 A | 4/1994 | Baker | |
| 5,328,597 A | 7/1994 | Boldt, Jr. | |
| 5,331,394 A | 7/1994 | Shalon | |
| 5,346,132 A | 9/1994 | Hahn | |
| 5,349,433 A | 9/1994 | Iwane | |
| 5,357,293 A | 10/1994 | Uomori | |
| 5,370,114 A | 12/1994 | Wong | |
| 5,396,303 A | 3/1995 | Peters | |
| 5,433,197 A | 7/1995 | Stark | |
| 5,443,801 A | 8/1995 | Langford | |
| 5,444,559 A | 8/1995 | Warnar | |
| 5,456,864 A | 10/1995 | Wickes | |
| 5,469,234 A | 11/1995 | Konishi | |
| 5,475,452 A | 12/1995 | Kuhn | |
| 5,579,079 A | 11/1996 | Yamada | |
| 5,592,246 A | 1/1997 | Kuhn | |
| 5,593,620 A | 1/1997 | Galas | |
| 5,598,243 A | 1/1997 | Takagi | |
| 5,620,717 A | 4/1997 | Wickes | |
| 5,648,024 A | 7/1997 | Galas | |
| 5,652,641 A | 7/1997 | Konishi | |
| 5,653,751 A | 8/1997 | Samiy et al. | |
| 5,657,109 A | 8/1997 | Konishi | |
| 5,657,110 A | 8/1997 | Konishi | |
| 5,682,210 A | 10/1997 | Weirich | |
| 5,686,548 A | 11/1997 | Grainger | |
| 5,686,549 A | 11/1997 | Grainger | |
| 5,696,998 A | 12/1997 | Yamada | |
| 5,712,721 A | 1/1998 | Large | |
| 5,717,959 A | 2/1998 | Tokunaga | |
| 5,719,668 A | 2/1998 | Oana | |
| 5,734,930 A | 3/1998 | Hagiwara | |
| 5,748,872 A | 5/1998 | Norman | |
| 5,757,544 A | 5/1998 | Tabata | |
| 5,759,318 A | 6/1998 | Galas | |
| 5,771,402 A | 6/1998 | Yamada | |
| 5,777,719 A | 7/1998 | Williams | |
| 5,793,339 A | 8/1998 | Takahashi | |
| 5,825,476 A | 10/1998 | Abitol | |
| 5,830,139 A | 11/1998 | Abreu | |
| 5,865,829 A | 2/1999 | Kitajima | |
| 5,873,832 A | 2/1999 | Maloney | |
| 5,893,515 A | 4/1999 | Hahn | |
| 5,905,129 A | 5/1999 | Murakami | |
| 5,910,836 A | 6/1999 | Ikezawa | |
| 5,913,080 A | 6/1999 | Yamada | |
| 5,929,970 A | 7/1999 | Mihashi | |
| 5,949,521 A | 9/1999 | Williams | |
| 5,951,934 A | 9/1999 | Wickes | |
| 5,971,537 A | 10/1999 | Fukuma | |
| 5,973,772 A | 10/1999 | Fukuma | |
| 5,983,029 A | 11/1999 | Yamada | |
| 6,002,484 A | 12/1999 | Rozema | |
| 6,002,518 A | 12/1999 | Faris | |
| 6,018,339 A | 1/2000 | Stevens | |
| 6,038,682 A | 3/2000 | Norman | |

(Continued)

Primary Examiner—Darryl J Collins

(57) ABSTRACT

The invention provides sparkle additives useful in producing cosmetic lenses, and lenses produced using the sparkle additives that produce a sparkle-effect when the lens is viewed on-eye. The sparkle effect is produced while, at the same time, maintaining the natural appearance of the eye.

19 Claims, No Drawings

U.S. PATENT DOCUMENTS

| | | | |
|---|---|---|---|
| 6,059,773 A | 5/2000 | Maloney |
| 6,061,064 A | 5/2000 | Reichlen |
| 6,095,651 A | 8/2000 | Williams |
| 6,120,460 A | 9/2000 | Abreu |
| 6,123,668 A | 9/2000 | Abreu |
| 6,154,855 A | 11/2000 | Norman |
| 6,186,628 B1 | 2/2001 | Van de Velde |
| 6,204,828 B1 | 3/2001 | Amir |
| 6,206,522 B1 | 3/2001 | Maloney |
| 6,213,943 B1 | 4/2001 | Abreu |
| 6,228,099 B1 | 5/2001 | Dybbs |
| 6,234,978 B1 | 5/2001 | Mihashi |
| 6,236,453 B1 | 5/2001 | Ikezawa |
| 6,284,161 B1 | 9/2001 | Thakrar |
| 6,302,850 B1 | 10/2001 | Tsukada |
| 6,307,526 B1 | 10/2001 | Mann |
| 6,312,393 B1 | 11/2001 | Abreu |
| 6,334,681 B1 | 1/2002 | Perrott |
| 6,337,040 B1 | 1/2002 | Thakrar |
| 6,338,559 B1 | 1/2002 | Williams |
| 6,346,100 B1 | 2/2002 | Tano |
| 6,353,436 B1 | 3/2002 | Reichlen |
| 6,359,684 B2 | 3/2002 | Ikezawa |
| 6,379,005 B1 | 4/2002 | Williams |
| 6,396,497 B1 | 5/2002 | Reichlen |
| 6,408,402 B1 | 6/2002 | Norman |
| 6,423,001 B1 | 7/2002 | Abreu |
| 6,445,365 B1 | 9/2002 | Taniguchi |
| 6,447,119 B1 | 9/2002 | Stewart |
| 6,486,943 B1 | 11/2002 | Burns et al. |
| 6,493,073 B2 | 12/2002 | Epstein |
| 6,494,878 B1 | 12/2002 | Pawlowski |
| 6,503,632 B1 | 1/2003 | Hayashi |
| 6,537,269 B1 | 3/2003 | Abe |
| 6,540,692 B2 | 4/2003 | Mihashi |
| 6,540,759 B2 | 4/2003 | Dybbs |
| 6,544,193 B2 | 4/2003 | Abreu |
| 6,550,917 B1 | 4/2003 | Neal |
| 6,572,230 B2 | 6/2003 | Levine |
| 6,574,501 B2 | 6/2003 | Lambert |
| 6,575,574 B2 | 6/2003 | DellaVecchia |
| 6,576,013 B1 | 6/2003 | Budman |
| 6,582,079 B2 | 6/2003 | Levine |
| 6,595,642 B2 | 7/2003 | Wirth |
| 6,595,643 B2 | 7/2003 | Levine |
| 6,604,826 B2 | 8/2003 | Akiyama |
| 6,609,794 B2 | 8/2003 | Levine |
| 6,614,408 B1 | 9/2003 | Mann |
| 6,620,858 B2 | 9/2003 | Cyr |
| 6,630,521 B2 | 10/2003 | Cyr |
| 6,631,991 B2 | 10/2003 | Wirth |
| 6,636,986 B2 | 10/2003 | Norman |
| 6,648,473 B2 | 11/2003 | DellaVecchia |
| 6,659,610 B2 | 12/2003 | Kasahara |
| 6,669,341 B2 | 12/2003 | Wirth |
| 6,681,127 B2 | 1/2004 | March |
| 6,689,828 B2 | 2/2004 | Cyr |
| 6,698,884 B2 | 3/2004 | Perrott |
| 6,703,438 B2 | 3/2004 | Hareyama |
| 6,709,108 B2 | 3/2004 | Levine |
| 6,713,641 B2 | 3/2004 | Weaver |
| 6,722,767 B2 | 4/2004 | Dick |
| 6,727,372 B2 | 4/2004 | Cyr |
| 6,733,122 B1 | 5/2004 | Feurer |
| 6,743,438 B2 | 6/2004 | Thakrar |
| 6,760,162 B2 | 7/2004 | Yeo |
| 6,762,794 B1 | 7/2004 | Ogino |
| 6,787,658 B2 | 9/2004 | Cyr |
| 6,811,854 B1 | 11/2004 | Sato |
| 6,833,858 B1 | 12/2004 | Ogino |
| 6,842,670 B2 | 1/2005 | Lin |
| 6,850,786 B2 | 2/2005 | March |
| 6,858,422 B2 | 2/2005 | Giver |
| 6,870,062 B2 | 3/2005 | Cyr |
| 6,870,063 B2 | 3/2005 | Cyr |
| 6,885,818 B2 | 4/2005 | Goldstein |
| 6,890,076 B2 | 5/2005 | Roorda |
| 6,902,922 B2 | 6/2005 | Ness |
| 6,905,641 B2 | 6/2005 | Platt |
| 6,908,195 B2 | 6/2005 | Fuller |
| 6,914,250 B2 | 7/2005 | Seville |
| 6,920,283 B2 | 7/2005 | Goldstein |
| 6,937,328 B2 | 8/2005 | Fukuma |
| 6,942,656 B2 | 9/2005 | Pawlowski |
| 6,948,818 B2 | 9/2005 | Williams |
| 6,958,039 B2 | 10/2005 | Burd |
| 6,961,599 B2 | 11/2005 | Lambert |
| 6,964,480 B2 | 11/2005 | Levine |
| 6,968,222 B2 | 11/2005 | Burd |
| 6,975,892 B2 | 12/2005 | Burd |
| 6,980,842 B2 | 12/2005 | March |
| 6,997,555 B2 | 2/2006 | Dick |
| 7,013,258 B1 | 3/2006 | Su |
| 7,030,244 B2 | 4/2006 | Cyr |
| 7,036,934 B1 | 5/2006 | Youssefi |
| 7,041,063 B2 | 5/2006 | Abreu |
| 7,042,805 B1 | 5/2006 | Kallman |
| 7,059,719 B2 * | 6/2006 | Asher ........................ 351/162 |
| 7,060,829 B2 | 6/2006 | Cyr |
| 7,068,444 B2 | 6/2006 | Nishi |
| 7,105,110 B2 | 9/2006 | Platt |
| 7,105,688 B2 | 9/2006 | Pearson |
| 7,108,656 B2 | 9/2006 | Fujikawa |
| 7,118,216 B2 | 10/2006 | Roorda |
| 7,118,217 B2 | 10/2006 | Kardon |
| 7,131,740 B2 | 11/2006 | Nishioka |
| 7,133,222 B2 | 11/2006 | Chintala |
| 7,138,539 B2 | 11/2006 | Cyr |
| 7,141,685 B2 | 11/2006 | Cyr |
| 7,146,983 B1 | 12/2006 | Hohla |
| 7,154,002 B1 | 12/2006 | Bressi |
| 7,160,587 B2 | 1/2007 | Doi |
| 7,169,801 B2 | 1/2007 | Bressi |
| 7,172,634 B2 | 2/2007 | Pearson |
| 7,179,308 B2 | 2/2007 | Pearson |
| 7,187,960 B2 | 3/2007 | Abreu |
| 7,188,950 B2 | 3/2007 | Dreher |
| 7,195,354 B2 | 3/2007 | Olivier |
| 7,202,852 B2 | 4/2007 | Harvie |
| 7,209,293 B2 | 4/2007 | Gaida |
| 2001/0001572 A1 | 5/2001 | Ikezawa et al. |
| 2001/0014812 A1 | 8/2001 | Dybbs |
| 2001/0016695 A1 | 8/2001 | Mihashi et al. |
| 2001/0034478 A1 | 10/2001 | Lambert et al. |
| 2001/0034500 A1 | 10/2001 | March |
| 2002/0007113 A1 | 1/2002 | March et al. |
| 2002/0027638 A1 | 3/2002 | Thakrar et al. |
| 2002/0049374 A1 | 4/2002 | Abreu |
| 2002/0049389 A1 | 4/2002 | Abreu |
| 2002/0058141 A1 | 5/2002 | Hareyama |
| 2002/0062255 A1 | 5/2002 | Tanaka et al. |
| 2002/0068725 A1 | 6/2002 | Cyr et al. |
| 2002/0071096 A1 | 6/2002 | Akiyama et al. |
| 2002/0071111 A1 | 6/2002 | Epstein |
| 2002/0085287 A1 | 7/2002 | Egawa |
| 2002/0085843 A1 | 7/2002 | Mann |
| 2002/0095617 A1 | 7/2002 | Norman |
| 2002/0100990 A1 | 8/2002 | Platt et al. |
| 2002/0113942 A1 | 8/2002 | Kasahara |
| 2002/0118464 A1 | 8/2002 | Nishioka et al. |
| 2002/0128343 A1 | 9/2002 | Cyr et al. |
| 2002/0132874 A1 | 9/2002 | Cyr et al. |
| 2002/0149739 A1 | 10/2002 | Perrott et al. |
| 2002/0149745 A1 | 10/2002 | Fukuma et al. |

| Pub. No. | Date | Name |
|---|---|---|
| 2002/0180931 A1 | 12/2002 | Dick et al. |
| 2003/0003295 A1 | 1/2003 | Dreher et al. |
| 2003/0007124 A1 | 1/2003 | Levine |
| 2003/0007125 A1 | 1/2003 | Levine |
| 2003/0007127 A1 | 1/2003 | Levine |
| 2003/0009155 A1 | 1/2003 | Pawlowski |
| 2003/0009156 A1 | 1/2003 | Levine |
| 2003/0021601 A1 | 1/2003 | Goldstein |
| 2003/0025874 A1 | 2/2003 | Williams |
| 2003/0045783 A1 | 3/2003 | March |
| 2003/0049827 A1 | 3/2003 | Ness |
| 2003/0053010 A1 | 3/2003 | Yeo |
| 2003/0053026 A1 | 3/2003 | Roorda |
| 2003/0053028 A1 | 3/2003 | Wirth |
| 2003/0053029 A1 | 3/2003 | Wirth |
| 2003/0053030 A1 | 3/2003 | Levine |
| 2003/0053031 A1 | 3/2003 | Wirth |
| 2003/0058404 A1 | 3/2003 | Thorn |
| 2003/0069489 A1 | 4/2003 | Abreu |
| 2003/0071969 A1 | 4/2003 | Levine |
| 2003/0071970 A1 | 4/2003 | Donnerhacke |
| 2003/0090628 A1 | 5/2003 | DellaVecchia |
| 2003/0090629 A1 | 5/2003 | DellaVecchia |
| 2003/0096390 A1 | 5/2003 | Giver |
| 2003/0125505 A1 | 7/2003 | Weaver |
| 2003/0134924 A1 | 7/2003 | Cyr |
| 2003/0139687 A1 | 7/2003 | Abreu |
| 2003/0139755 A1 | 7/2003 | Dybbs |
| 2003/0173525 A1 | 9/2003 | Seville |
| 2003/0193647 A1 | 10/2003 | Neal |
| 2003/0210378 A1 | 11/2003 | Riza |
| 2003/0219909 A1 | 11/2003 | Lally |
| 2003/0224534 A1 | 12/2003 | Kawate |
| 2003/0231827 A1 | 12/2003 | Andersen |
| 2004/0002694 A1 | 1/2004 | Pawlowski |
| 2004/0015735 A1 | 1/2004 | Norman |
| 2004/0019283 A1 | 1/2004 | Lambert |
| 2004/0027621 A1 | 2/2004 | Masuda |
| 2004/0039297 A1 | 2/2004 | Abreu |
| 2004/0039298 A1 | 2/2004 | Abreu |
| 2004/0044418 A1 | 3/2004 | Goldstein |
| 2004/0059014 A1 | 3/2004 | Cyr |
| 2004/0059124 A1 | 3/2004 | Cyr |
| 2004/0059207 A1 | 3/2004 | March |
| 2004/0059212 A1 | 3/2004 | Abreu |
| 2004/0075812 A1 | 4/2004 | Kardon |
| 2004/0100619 A1 | 5/2004 | Olivier |
| 2004/0102637 A1 | 5/2004 | Cyr |
| 2004/0106756 A1 | 6/2004 | Tei |
| 2004/0110812 A1 | 6/2004 | Cyr |
| 2004/0114101 A1* | 6/2004 | Thakrar ...................... 351/162 |
| 2004/0117253 A1 | 6/2004 | Tsushi |
| 2004/0122072 A1 | 6/2004 | Cyr |
| 2004/0127778 A1 | 7/2004 | Lambert |
| 2004/0135972 A1 | 7/2004 | Della Vecchia |
| 2004/0142995 A1 | 7/2004 | Cyr |
| 2004/0150728 A1 | 8/2004 | Ogino |
| 2004/0158128 A1 | 8/2004 | Fujikawa |
| 2004/0165146 A1 | 8/2004 | Della Vecchia |
| 2004/0165147 A1 | 8/2004 | Della Vecchia |
| 2004/0174495 A1 | 9/2004 | Levine |
| 2004/0174499 A1 | 9/2004 | Toshima |
| 2004/0174596 A1 | 9/2004 | Umeki |
| 2004/0180391 A1 | 9/2004 | Gratzl |
| 2004/0196435 A1 | 10/2004 | Dick |
| 2004/0203130 A1 | 10/2004 | Ness |
| 2004/0207811 A1 | 10/2004 | Elsner |
| 2004/0220457 A1 | 11/2004 | Burd |
| 2004/0220458 A1 | 11/2004 | Burd |
| 2004/0220704 A1 | 11/2004 | Lin |
| 2004/0233383 A1 | 11/2004 | Sandler |
| 2004/0237969 A1 | 12/2004 | Fuller |
| 2004/0239876 A1 | 12/2004 | Levine |
| 2004/0242976 A1 | 12/2004 | Abreu |
| 2004/0254220 A1 | 12/2004 | Bressi |
| 2004/0266769 A1 | 12/2004 | Bressi |
| 2005/0012896 A1 | 1/2005 | Fukuma |
| 2005/0015120 A1 | 1/2005 | Seibel |
| 2005/0018132 A1 | 1/2005 | Fukuma |
| 2005/0029021 A1 | 2/2005 | Rigazzi |
| 2005/0033420 A1 | 2/2005 | Christie |
| 2005/0041204 A1 | 2/2005 | Clark |
| 2005/0041308 A1 | 2/2005 | Gaida |
| 2005/0044644 A1 | 3/2005 | Pearson |
| 2005/0046794 A1 | 3/2005 | Silvestrini |
| 2005/0047629 A1 | 3/2005 | Farrell |
| 2005/0049425 A1 | 3/2005 | Pearson |
| 2005/0059777 A1 | 3/2005 | Doi |
| 2005/0060196 A1 | 3/2005 | Tsushi |
| 2005/0073648 A1 | 4/2005 | Toshima |
| 2005/0074616 A1 | 4/2005 | Harchanko |
| 2005/0085701 A1 | 4/2005 | Burd |
| 2005/0094287 A1 | 5/2005 | Yeo |
| 2005/0097179 A1 | 5/2005 | Orme |
| 2005/0104240 A1 | 5/2005 | Jethmalani |
| 2005/0105043 A1 | 5/2005 | Dreher |
| 2005/0105048 A1 | 5/2005 | Warden |
| 2005/0106400 A1 | 5/2005 | Kuramoto |
| 2005/0119737 A1 | 6/2005 | Bene |
| 2005/0137232 A1 | 6/2005 | Bressi |
| 2005/0137234 A1 | 6/2005 | Bressi |
| 2005/0159470 A1 | 7/2005 | Bressi |
| 2005/0160009 A1 | 7/2005 | Tanaka |
| 2005/0162575 A1 | 7/2005 | Harvie |
| 2005/0192563 A1 | 9/2005 | Platt |
| 2005/0195364 A1 | 9/2005 | Dai |
| 2005/0205885 A1 | 9/2005 | Nakagawa |
| 2005/0214919 A1 | 9/2005 | Giver |
| 2005/0219461 A1 | 10/2005 | Hirohara |
| 2005/0221276 A1 | 10/2005 | Rozakis |
| 2005/0225630 A1 | 10/2005 | Childers |
| 2005/0243054 A1 | 11/2005 | Beymer |
| 2005/0254006 A1 | 11/2005 | Dai |
| 2005/0259335 A1 | 11/2005 | Nishioka |
| 2005/0270491 A1 | 12/2005 | Dai |
| 2005/0272013 A1 | 12/2005 | Knight |
| 2005/0280777 A1 | 12/2005 | Dai |
| 2005/0286019 A1 | 12/2005 | Wiltberger |
| 2006/0003261 A1 | 1/2006 | Imai |
| 2006/0017883 A1 | 1/2006 | Dai |
| 2006/0022176 A1 | 2/2006 | Wang |
| 2006/0023162 A1 | 2/2006 | Azar |
| 2006/0033879 A1 | 2/2006 | Covannon |
| 2006/0044510 A1 | 3/2006 | Williams |
| 2006/0052469 A1 | 3/2006 | Cyr |
| 2006/0072070 A1 | 4/2006 | Kuiper |
| 2006/0072215 A1 | 4/2006 | Nishi |
| 2006/0072782 A1 | 4/2006 | Abe |
| 2006/0077566 A1 | 4/2006 | Nishioka |
| 2006/0077571 A1 | 4/2006 | Chintala |
| 2006/0078858 A1 | 4/2006 | Vroman |
| 2006/0079959 A1 | 4/2006 | Christie |
| 2006/0079960 A1 | 4/2006 | Christie |
| 2006/0087617 A1 | 4/2006 | Roorda |
| 2006/0095128 A1 | 5/2006 | Blum |
| 2006/0098087 A1 | 5/2006 | Brandt |
| 2006/0100677 A1 | 5/2006 | Blumenkranz |
| 2006/0109558 A1 | 5/2006 | Nishioka |
| 2006/0113054 A1 | 6/2006 | Silvestrini |
| 2006/0118263 A1 | 6/2006 | Silvestrini |
| 2006/0119793 A1 | 6/2006 | Hillis |
| 2006/0119794 A1 | 6/2006 | Hillis |
| 2006/0122530 A1 | 6/2006 | Goodall |
| 2006/0122531 A1 | 6/2006 | Goodall |
| 2006/0139572 A1 | 6/2006 | Noda |
| 2006/0146281 A1 | 7/2006 | Goodall |

| | | |
|---|---|---|
| 2006/0147737 A1 | 7/2006 | Pearson |
| 2006/0152675 A1 | 7/2006 | Toshima |
| 2006/0152677 A1 | 7/2006 | Youssefi |
| 2006/0171032 A1 | 8/2006 | Nishioka |
| 2006/0173511 A1 | 8/2006 | Greenberg |
| 2006/0176449 A1 | 8/2006 | Azar |
| 2006/0177476 A1 | 8/2006 | Saffran |
| 2006/0184243 A1 | 8/2006 | Yilmaz |
| 2006/0188144 A1 | 8/2006 | Sasaki |
| 2006/0190058 A1 | 8/2006 | Greenberg |
| 2006/0197775 A1 | 9/2006 | Neal |
| 2006/0199105 A1 | 9/2006 | Cahill |
| 2006/0209256 A1 | 9/2006 | Beyerlein |
| 2006/0222675 A1 | 10/2006 | Sabnis |
| 2006/0224057 A1 | 10/2006 | Burd |
| 2006/0227067 A1 | 10/2006 | Iwasaki |
| 2006/0238710 A1 | 10/2006 | Dick |
| 2006/0238897 A1 | 10/2006 | Nishioka |
| 2006/0244907 A1 | 11/2006 | Simmons |
| 2006/0245087 A1 | 11/2006 | Tearney |
| 2006/0258918 A1 | 11/2006 | Burd |
| 2006/0258919 A1 | 11/2006 | Burd |
| 2006/0258920 A1 | 11/2006 | Burd |
| 2006/0261502 A1 | 11/2006 | Platt |
| 2006/0264916 A1 | 11/2006 | Yee |
| 2006/0268226 A1 | 11/2006 | Christie |
| 2006/0268227 A1 | 11/2006 | Christie |
| 2006/0268228 A1 | 11/2006 | Christie |
| 2006/0268229 A1 | 11/2006 | Silvestrini |
| 2006/0270946 A1 | 11/2006 | Silvestrini |
| 2006/0271026 A1 | 11/2006 | Silvestrini |
| 2006/0271027 A1 | 11/2006 | Silvestrini |
| 2006/0271176 A1 | 11/2006 | Christie |
| 2006/0271177 A1 | 11/2006 | Christie |
| 2006/0271178 A1 | 11/2006 | Christie |
| 2006/0271179 A1 | 11/2006 | Christie |
| 2006/0271180 A1 | 11/2006 | Christie |
| 2006/0271181 A1 | 11/2006 | Christie |
| 2006/0271182 A1 | 11/2006 | Christie |
| 2006/0271183 A1 | 11/2006 | Christie |
| 2006/0271184 A1 | 11/2006 | Silvestrini |
| 2006/0271185 A1 | 11/2006 | Silvestrini |
| 2006/0274264 A1 | 12/2006 | Christie |
| 2006/0274265 A1 | 12/2006 | Christie |
| 2006/0276713 A1 | 12/2006 | Maier |
| 2006/0282960 A1 | 12/2006 | Pearson |
| 2006/0290471 A1 | 12/2006 | Van Alstyne |
| 2007/0002274 A1 | 1/2007 | Somani |
| 2007/0004866 A1 | 1/2007 | Schorzman |
| 2007/0004867 A1 | 1/2007 | Schorzman |
| 2007/0004868 A1 | 1/2007 | Schorzman |
| 2007/0004886 A1 | 1/2007 | Schorzman |
| 2007/0004897 A1 | 1/2007 | Schorzman |
| 2007/0010400 A1 | 1/2007 | Sabnis |
| 2007/0010757 A1 | 1/2007 | Goodall |
| 2007/0016074 A1 | 1/2007 | Abreu |
| 2007/0019157 A1 | 1/2007 | Hillis |
| 2007/0019272 A1 | 1/2007 | Hillis |
| 2007/0019279 A1 | 1/2007 | Goodall |
| 2007/0028931 A1 | 2/2007 | Hillis |
| 2007/0032598 A1 | 2/2007 | Cyr |
| 2007/0035051 A1 | 2/2007 | Darnton |
| 2007/0052876 A1 | 3/2007 | Kaufman |
| 2007/0052886 A1 | 3/2007 | Fan |
| 2007/0055222 A1 | 3/2007 | Hohla |
| 2007/0055336 A1 | 3/2007 | Greenberg |
| 2007/0061393 A1 | 3/2007 | Moore |
| 2007/0074590 A1 | 4/2007 | Smith |
| 2007/0076167 A1 | 4/2007 | Kumar |
| 2007/0078198 A1 | 4/2007 | Otsuji |
| 2007/0078254 A1 | 4/2007 | Matsumoto |

\* cited by examiner

COSMETIC CONTACT LENSES HAVING A SPARKLE EFFECT

CROSS-REFERENCE TO RELATED APPLICATIONS

This application claims the benefit of U.S. Provisional Application 61/015,216, filed Dec. 20, 2007, which is hereby incorporated by reference in its entirety.

BACKGROUND OF THE INVENTION

The invention relates to contact lenses having a sparkle effect and sparkle additives useful in the production of cosmetic contact lenses. In particular, the invention is directed to sparkle additives that use interference particles to provide a sparkle effect to the lenses.

The use of cosmetic contact lenses to alter or augment the natural color of the iris is well known. Colorants used in cosmetic lenses generally are prepared with binding polymer to form a colorant mix. A variety of pigments are commercially available for use in the production of tinted contact lens. Typically, the cosmetic lenses use either or both opaque and translucent colors to change the color of an iris, as for example, from brown to blue. Additionally, cosmetic lenses have been manufactured that attempt to enhance the eye to produce a more striking appearance so as to draw attention to the eye with or without changing the color of the iris. For example, colorants that incorporate pigments capable of producing a pearl-type luster, phosphorescent pigments to produce a glow-effect, pigments with reflective material and the like are known.

These lenses are disadvantageous because either the enhancement is too subtle to be noticed when the lens is on-eye or the enhancement lends an unnatural appearance to the wearer's iris. Cosmetic lenses that enhance the appearance of the eye without seeming unnatural are desirable.

SUMMARY OF THE INVENTION

One aspect of the invention is a contact lens incorporating sparkle additives that produce a sparkle effect when the lens is viewed on-eye. The sparkle effect is produced while, at the same time, maintaining the natural appearance of the eye.

In another aspect of the invention, contact lenses having sparkle effect exhibit a sparkle density value ($\rho$) that is greater than about 0.5 count/mm$^2$.

In yet another aspect of the invention, contact lenses having sparkle effect include sparkle particles that are randomly distributed within the area in the lens in which they are dispersed.

In a yet further aspect of the invention, contact lenses having a sparkle effect have a $K_{sp}$ greater than 0.25.

In yet another aspect of the invention, contact lenses with sparkle effect have greater than about 0.5 to about 50 wt % cholesteric liquid crystal particles based on the total weight of sparkle additive composition (including binder, sparkle particle additive, and solvent).

In yet another aspect of the invention, contact lenses with sparkle effect comprise cholesteric liquid crystal particles and one or more organic or inorganic pigments.

DETAILED DESCRIPTION

By selecting certain particles to incorporate into a cosmetic lens, a sparkle-effect may be obtained when the lens is observed on-eye. The additives useful in the invention are cholesteric liquid crystal particles, which are transparent platelets of an organic polymer network with a helical liquid crystal structure. Unlike interference systems, such as an interference stack, in which a cosmetic effect is obtained by light reflection through multiple layers, the cholesteric liquid crystal particles provide a cosmetic effect, sparkle effect and/or color change by transmission and reflection of light by a layer of material.

Cholesteric liquid crystal particles useful in the invention are those that are suitable for incorporation into the lens material, can be used with the desired printing technology, such as pad-printing, ink-jet printing and the like, and are of a particle size for use in contact lenses. Examples of commercially available particles useful in the invention include, without limitation, HELICONE® additives available from LCP Technology GmbH, Burghausen, Germany.

The sparkle effect observed in the practice of this invention can be subjectively observed when lenses that incorporate the sparkle additive compositions of this invention are worn on-eye or on devices used to simulate eyes. Lenses so made have an appearance described as glittery, twinkly, pixie dust, brightening/lightening, sparkly, luminescent, wet, moist, fresh, awake, energetic, lively, vivacious, and alert.

Objectively, the sparkle effect is quantified by reference to a number of sparkle factors including reflective properties and the randomness of the pattern of sparkle additive particles in the contact lens. Preferably, the lenses of the invention exhibit greater than 35 points of reflection (or sparkle count) and most preferably they are greater than 45 when measured as described below. An additional sparkle effect factor is the area of the coverage of the particles. Indexing the number of reflective points (sparkle count) to the area in which the sparkle additive is applied is the most preferred component for assessing sparkle effect. This sparkle density value ($\rho$) is defined as follows: $\rho = n/A_p$, where n=sparkle count and $A_p$=the area containing the sparkle additive (measured as described below). Sparkle occurs when $\rho$>about 0.5 count/mm$^2$, preferably it is greater than about 1 count/mm$^2$, and most preferably it is greater than about 4 count/mm$^2$.

An additional sparkle effect factor is the degree of randomness of the pattern of particles in the lens. A random distribution of particles of the invention results in a natural sparkle effect whereas non-random distributions do not. Non-random distributions do not look natural. This is expressed as a $k_{sp}$ value (measured as described below) and is calculated with respect to the brightness or intensity of the main peak of a Fourier Transform of an illuminated lens, $I_C$ and brightest secondary peak $I_S$ as follows:

$$k_{SP} = (1 - I_S / I_C)$$

Referring to the definition of $k_{sp}$, it can be seen that if the secondary peak is as bright as the main peak, then $k_{sp}$ will be equal to zero. Conversely, if the secondary peak is zero, then $k_{sp}$ will be equal to one. Lenses having $k_{sp}$ values greater than 0.55 and preferably approaching 1 have sufficient randomness for exhibiting a natural sparkle effect.

The preferred values for sparkle densities ($\rho$) of greater than about 0.5 count/mm$^2$, preferably it is greater than about 1 count/mm$^2$, and most preferably it is greater than about 4 count/mm$^2$ with randomness factor $k_{sp}$ values greater than 0.55 and preferably approaching 1.

Sparkle effect can be observed by illuminating the lens, imaging the illuminated lens, and then analyzing the image to determine the sparkle effect factors. This is best done with a high resolution CCD camera affixed to a stabilized platform. The CCD camera is preferably at a distance of 97 +/−3 mm with the zoom on its lowest setting. The lenses are placed on a lens holder that is curved (with all air bubbles between the contact and the lens holder eliminated and all folds, wrinkles, or other features that may cause glare or shadows removed). The lenses are periodically moistened throughout the process, preferably with artificial tear solution (such as Prestige Brand Sterile Artifical Tears Lubricant Eye props) or saline solution (such as Target store brand Saline Solution for Sensitive Eyes). Ambient light is reduced as much as possible. Multiple images (preferably about ten) of the lens with light cast upon it are taken by rotating 30° ±/−5° between pictures and moistening with saline solution as needed. Exposure time is preferably about 600 ms.

The lens and lens holder is illuminated with a light source such as a DC-950 Fiber Lite (produced by Dolan-Jenner Industries of 159 Swanson Road, Boxborough, Mass.) together with a light collimating attachment and a polarizer (more preferably a right handed polarizer). These are preferably stabilized in a fixed position at an angle of twenty degrees to the lens so that light is cast on it with an intensity of 2,500-3,000 Lux. Preferably the light source is at a distance of about 135 mm from the lens in the lens holder. Sparkle count, or points of reflection, are counted in the images obtained from the camera. The sparkle count (or points of reflection) is preferably determined using ImagePro 8 software (commercially available from Media Cybernetics, Bethesda, Md., by: a) resizing the image to 10 or 15%, b) converting to 16-bit grayscale image twice, c) applying a "despeckle" filter to one gray image, d) selecting the remaining image and performing a background subtraction to subtract the despeckled image from the remaining gray image, e) engaging the "count" function (with the threshold set to "manual" with range "10,000-65,535"), f) removing any obvious bad points, such as glare in the pupil area or stray points outside of the printed contact, g) recording the number of counted objects. This is preferably repeated on remaining 9 more images and the average number of points of reflection (or sparkle count) recorded. "Area" measurement is determined with ImagePro 8 software (commercially available from Media Cybernetics, Bethesda, Md., by using the Manual Bright Objects and adjusting lower range value until pattern features are counted as one bright object and then using "Area" measurement in Measurement menu.

Randomness is best distinguished using a Fourier Transform analysis approach. The Fourier Transform shows the component frequencies of the reflections of an image of the lenses. Preferably, the Fourier Transform image is formulated to express the image's frequency domain as a symmetrically centered cloud of points wherein brightness represents the amplitude of the Fourier component and position represents its spatial frequency. Random or unordered images provide a diffuse Fourier transform with a central peak only. In cases in which the transform patterns show discernable sharp peaks outside the central peak it is because of periodicity (non-randomness or order) and the positions of the peaks are related inversely to spatial periodicities in the original image and lens. The most preferred method of obtaining these measurements is using the equipment, images and ImagePro 8 software described above with the FFT (Fast Fourier Transform) function. That is, after equipment set up, including but not limited to CCD camera, light source, lens and lens holder, a representative image is selected and (a) converted to 16-bit grayscale, (b) the FFT function was engaged (via pressing the icon, selecting "Amplitude" (floating pt.), setting the spectrum gain to 15, and selecting "Forward". This produces the Fourier Transform image from which randomness can be determined and the randomness factor ($k_{sp}$) is calculated (1−(height of side peaks divided by height of central peak)).

The amount of the sparkle additive used is a sparkle effective amount meaning an amount that results in one or more areas of the lens having a sparkle effect when the lens is observed on-eye. Typically, an amount of about 0.5 to about 50 weight percent based on the total weight of the sparkle additive composition (including binder, cholesteric particle additive, and solvent) may be used. The particle size distribution range is approximately 4 to 70 um, preferably 4 to about 35 μm and most preferably about 18 to about 35 μm, in each case measuring the longest dimension of the particle. Those skilled in the art will realize that listed particle sizes refer to the average of the particle size and that a normal distribution around the average occurs.

Pigments in addition to the cholesteric liquid crystal additives may be used in the sparkle additive composition. Such additional pigments may be those organic or inorganic pigments suitable for use in contact lenses, or combinations of such pigments. Illustrative organic pigments include, without limitation, pthalocyanine blue, pthalocyanine green, carbazole violet, vat orange #1, and the like and combinations thereof. Examples of useful inorganic pigments include, without limitation, iron oxide black, iron oxide brown, iron oxide yellow, iron oxide red, titanium dioxide, and the like, and combinations thereof. In addition to these pigments, soluble and non-soluble dyes may be used including, without limitation, dichlorotriazine and vinyl sulfone-based dyes. Useful dyes and pigments are commercially available.

The sparkle additive compositions used in the lenses of the invention are composed of one or more sparkle additives with at least one of the sparkle additives being a cholesteric liquid crystal additive, one or more solvents, and a binding polymer. In a preferred embodiment of the invention, a binding polymer is used that is capable of forming an interpenetrating polymer network with the lens material. For purposes of the invention, "interpenetrating polymer network" or "IPN" is defined as the combination of two or more independent polymers in which one polymer is synthesized and/or cross-linked in the presence of the other. Thus, some degree of interpenetration occurs within the network structures. Typically, the independent polymers used to form the IPN are in network form. One type of IPN, specifically a semi-IPN, is composed of one or more polymers that are cross-linked and one or more polymers that are not substantially cross-linked as disclosed by "Interpenetrating Polymer Networks: An Overview" by Sperling, L. H. in *Interpenetrating Polymer Networks*, Edited by Klempner, Sperling, and Utracki, pp 3-6 (1994). For the purposes of the invention, the type of interpenetrating polymer network used is a semi-IPN. In one embodiment, the semi-IPN is formed using a lens material, which is crosslinked and a binding polymer that is not substantially crosslinked. For the purposes of this invention not substantially crosslinked means that the non-crosslinked material is not subjected to conventional crosslinking conditions prior to contact with the lens material. Semi-IPNs may be formed in one step, or in a series of steps, which are known as sequential semi-IPNs. One of ordinarily skilled in the art will recognize that, the presence of cross-linking agents, either through addition or as impurities, can create a reaction environment that favors the formation of a sequential interpenetrating polymer network.

The binding polymers useful in the additive composition are made from a homopolymer or copolymer, or combinations thereof, having similar solubility parameters to each other and the binding polymer has similar solubility parameters to the lens material. These binding polymers may contain functional groups that render the polymers and copolymers of the binding polymer capable of interactions with each other. The functional groups must be such that the groups of one polymer or copolymer interact with that of another in a manner that increases the density of the interactions helping to inhibit the mobility of and/or entrap the additives and/or particles. The interactions between the functional groups may be polar, dispersive, or of a charge transfer complex nature. The functional groups may be located on the polymer or copolymer backbones or be pendant from the backbones.

For example, a monomer, or mixture of monomers, that form a polymer with a positive charge may be used in conjunction with a monomer or monomers that form a polymer with a negative charge to form the binding polymer. As a more specific example, methacrylic acid ("MAA") and 2-hydroxyethylmethacrylate ("HEMA") may be used to provide a MAA/HEMA copolymer that is then mixed with a HEMA/3-(N,N-dimethyl) propyl acrylamide copolymer to form the binding polymer.

As another example, the binding polymer may be composed of hydrophobically-modified monomers including, without limitation, amides and esters of the formula:

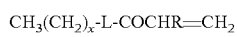

wherein L may be —NH or oxygen, x may be a whole number from 2 to 24, R may be a $C_1$ to $C_6$ alkyl or hydrogen and preferably is methyl or hydrogen. Examples of such amides and esters include, without limitation, lauryl methacrylamide, and hexyl methacrylate. As yet another example, polymers of aliphatic chain extended carbamates and ureas may be used to form the binding polymer.

Preferred binding polymers will depend upon the lens material to be used. For etafilcon A, the preferred binding polymers are a random block copolymer of HEMA, and MAA or a homopolymer of HEMA. The weight percentages, based on the total weight of the binding polymer, of each component in these embodiments is about 93 to about 100 weight percent HEMA and about 0 to about 2 weight percent MAA. For narafilcon A, the preferred binding polymers are a random block copolymer of HEMA, OH-mPDMS, DMA, and, optionally, PVP.

The molecular weight of the binding polymer must be such that it is somewhat soluble in the lens material and the lens material can diffuse into it. However, at the same time, the molecular weight of the binding polymer cannot be so high as to impact the quality of the printed image. For etafilcon A, preferably, the molecular weight of the binding polymer is about 7,000 to about 100,000, more preferably about 7,000 to about 40,000, most preferably about 17,000 to about 35,000 $M_{peak}$ which corresponds to the molecular weight of the highest peak in the SEC analyses ($=(M_n \times M_w)^{1/2}$) MW ranges can be significantly higher for binding polymers containing silicones including up to about 500,000 molecular weight.

For purposes of the invention, the molecular weight is determined using a gel permeation chromatograph with a 90° light scattering and refractive index detectors. Two columns of PW4000 and PW2500, a methanol-water eluent of 75/25 wt/wt adjusted to 50 mM sodium chloride and a mixture of polyethylene glycol and polyethylene oxide molecules with well defined molecular weights ranging from 325,000 to 194 are used. This method is only for EtaA and binding polymers soluble in methanol-water eluent of 75/25 wt/wt. Binding polymers containing silicones may be soluble in alternate diluents.

One ordinarily skilled in the art will recognize that, by using chain transfer agents in the production of the binding polymer, by using large amounts of initiator, by using living polymerization, by selection of appropriate monomer and initiator concentrations, by selection of amounts and types of solvent, or combinations thereof, the desired binding polymer molecular weight may be obtained. Preferably, a chain transfer agent is used in conjunction with an initiator, or more preferably with an initiator and one or more solvents to achieve the desired molecular weight. Alternatively, small amounts of very high molecular weight binding polymer may be used in conjunction with large amounts of solvent to maintain a desired viscosity for the binding polymer. Preferably, the viscosity of the binding polymer will be about 4,000 to about 15,000 centipoise at 23° C.

Chain transfer agents useful in forming the binding polymers have chain transfer constants values of greater than about 0.01, preferably greater than about 7, and more preferably greater than about 25,000. Suitable such chain transfer agents are known and include, without limitation, aliphatic thiols of the formula R-SH wherein R is a $C_1$ to $C_{12}$ aliphatic, a benzyl, a cyclicalipahtic or $CH_3(CH_2)_x$—SH wherein x is 1 to 24, benzene, n-butyl chloride, t-butyl chloride, n-butyl bromide, 2-mercapto ethanol, 1-dodecyl mercaptan, 2-chlorobutane, acetone, acetic acid, chloroform, butyl amine, triethylamine, di-n-butyl sulfide and disulfide, carbon tetrachloride and bromide, and the like, and combinations thereof. Generally, about 0 to about 7 weight percent based on the total weight of polymer formulation will be used. Preferably dodecanethiol, decanethiol, octanethiol, or combinations thereof is used as the chain transfer agent.

Any desirable initiators may be used including, without limitation, ultra-violet, visible light, thermal initiators and the like and combinations thereof.

Preferably, a thermal initiator is used, more preferably 2,2-azobis isobutyronitrile and 2,2-azobis 2-methylbutyronitrile. The amount of initiator used will be about 0.1 to about 5 weight percent based on the total weight of the formulation. For etafilcon A, preferably, 2,2-azobis 2-methylbutyronitrile is used with dodecanethiol.

The binding polymers of the invention may be made by any convenient polymerization process including, without limitation, radical chain polymerization, step polymerization, emulsion polymerization, ionic chain polymerization, ring opening, group transfer polymerization, atom transfer polymerization, and the like. Preferably, a thermal-initiated, free-radical polymerization is used. Conditions for carrying out the polymerization are within the knowledge of one ordinarily skilled in the art.

Solvents useful in the production of the binding polymer are medium boiling solvents having boiling points between about 120 and 230° C. Selection of the solvent to be used will be based on the type of binding polymer to be produced and its molecular weight. Suitable solvents include, without limitation, diacetone alcohol, cyclohexanone, isopropyl lactate, 3-methoxy 1-butanol, 1-ethoxy-2-propanol, ethanol, and the like.

Coating, or wetting, of the cholesteric liquid crystal additives with binding polymer provides better dispersion of the additives in the bulk binding polymer. The coating may be achieved by use of dispersive, electrostatic, or hydrogen bonding forces to cover the additive's surface.

In addition to the sparkle additives and binding polymer, the preferred sparkle additive composition of the invention may contain one or more solvents that aid in coating of the sparkle additive onto a surface. It may be desirable to control the sparkle additive composition's surface tension. This surface tension may be achieved by treatment of the surface, for example a mold surface, to which the sparkle additive composition will be applied. Surface treatments may be effected by methods known in the art, such as, but not limited to plasma and corona treatments. Alternatively, and preferably, the desired surface tension may be achieved by the choice of solvents used in the sparkle additive composition.

Thus, the solvents useful in the sparkle additive composition of the invention are those solvents that are capable of increasing or decreasing the viscosity of the sparkle additive composition and aiding in controlling the surface tension. Suitable solvents include, without limitation, cyclopentanones, 4-methyl-2-pentanone, 1-methoxy-2-propanol, 1-ethoxy-2-propanol, isopropyl lactate, ethanol, and the like and combinations thereof. For etafilcon A, preferably, 1-ethoxy-2-propanol and isopropyl lactate are used. For narafilcon A, preferably, 1-ethoxy-2-propanol and ethanol are used.

The specific amount of solvents used will depend on a number of factors. For example, the amount of solvents used in forming the binding polymer will depend upon the molecular weight of the binding polymer desired and the constituents, such as the monomers and copolymers, used in the binding polymer. The amount of low boiling solvent used will depend upon the viscosity and surface tension desired for the sparkle additive composition. Further, if the sparkle additive composition is to be applied to a mold and cured with a lens material, the amount of solvent used will depend upon the lens and mold materials used and whether the mold material has undergone any surface treatment to increase its wettability. Determination of the precise amount of solvent to be used is within the skill of one ordinarily skilled in the art. Generally, the total weight of the solvents used will be about 20 to about 75 weight percent of total additive composition will be used.

One ordinarily skilled in the art will recognize that each particle/additive used will have a critical particle/additive volume for the solvents selected. The critical particle/additive volume may be determined by any known means and, generally, is a volume based on the efficiency of a solvent and the binding polymer to suspend the pigment/additive particles for example, as disclosed in Patton, Temple C., *Paint Flow and Pigment Dispersion,* 2d ed., pp 126-300 (1993).

A plasticizer may be added to the sparkle additive composition to reduce cracking during the drying of the colorant and optical mold parts, to enhance the final quality of the image produced using the sparkle additive composition, and to enhance the diffusion and swelling of the colorant by the lens material. The type and amount of plasticizer used will depend on the molecular weight of the binding polymer used and, for sparkle additive compositions placed onto molds that are stored prior to use, the shelf-life stability desired. Useful plasticizers include, without limitation, glycerol, propylene glycol, dipropylene glycol, tripropylene glycol, polyethylene glycol 200, 400, or 600, and the like and combinations thereof. Preferably, glycerol is used. Amounts of plasticizer used generally will be 0 to about 10 weight percent based on the weight of the sparkle additive composition.

The opacity of the sparkle additive composition may be controlled by varying the sparkle additive concentration and the sparkle additive particle size used. Alternatively, an opacifying agent may be used. Suitable opacifying agents, such as for example titanium dioxide or zinc oxide, are commercially available. The intensity of the sparkle-effect may be controlled by varying the sparkle additive concentration and particle size or, in the case in which additional organic or inorganic pigments that are not cholesteric liquid crystal pigments are used in addition, the sparkle-effect may be controlled by varying the concentrations of these additional pigments as well.

In a preferred sparkle additive composition mixture of the invention, about 0.5 to about 50 weight percent of cholesteric liquid crystal additive, about 10 to about 45 weight percent of binding polymer, about 20 to about 70 weight percent of solvents, and, optionally, about 0.2 to about 7 weight percent of plasticizer is used. The weight percentages are based on the total weight of the sparkle additive composition mixture.

In addition to the cholesteric liquid crystal sparkle additives, an amount of about 0 to about 25 weight percent based on the weight of the colorant for organic pigments and about 0 to about 50 weight percent for inorganic pigments may be used. However, high pigment concentrations of the additional pigments may impart a very dark hue. Therefore, preferably about 0 to about 7 weight percent of organic pigments and about 0 to about 20 weight percent of inorganic pigments may be used. Combinations of pigments may be used in ratios dependent upon the color, shade, and hue desired.

One ordinarily skilled in the art will recognize that additives other than those discussed also may be included in the sparkle additive composition of the invention. Suitable additives include, without limitation, additives that aid flow and leveling, additives for foam prevention, additives for rheology modification, and the like, and combinations thereof.

The sparkle additive composition of the invention becomes embedded in the lens material upon curing of the material. Thus, the sparkle additive composition may embed closer to the front or back surface of the lens formed depending on the surface of the mold to which the lens the sparkle additive composition is applied. Additionally, one or more layers of sparkle additive composition may be applied in any order. In yet another embodiment, a clear binding polymer layer may be used in conjunction with the sparkle additive composition. For example, in the method of the invention a clear binding polymer layer may be applied to the molding surface of a mold half prior to application of the sparkle additive composition. The clear binding polymer may be the same or different from the binding polymer used for the sparkle additive composition layers. If the clear binding polymer is different from the binding polymer, it must be compatible with the binding polymer and lens material in terms of expansion factor and ability to swell and it must be capable of swelling into the lens material.

The invention may be used to provide cosmetic hard or soft contact lenses made of any known lens material, or material suitable for manufacturing such lenses. Preferably, the lenses of the invention are soft contact lenses having water contents of about 0 to about 90 percent. More preferably, the lenses are made of monomers containing hydroxy groups, carboxyl groups, or both or be made from silicone-containing polymers, such as siloxanes, hydrogels, silicone hydrogels, and combinations thereof. Material useful for forming the lenses of the invention may be made by reacting blends of macromers, monomers, and combinations thereof along with additives such as polymerization initiators. Suitable materials include, without limitation, silicone hydrogels made from silicone macromers and hydrophilic monomers. Examples of such silicone macromers include, without limitation, polydimethylsiloxane methacrylated with pendant hydrophilic groups as described in U.S. Pat. Nos. 4,259,467; 4,260,725 and 4,261,875; polydimethylsiloxane macromers with polymerizable function described in U.S. Pat. Nos. 4,136,250; 4,153,641; 4,189,546; 4,182,822; 4,343,927; 4,254,248; 4,355,147; 4,276,402; 4,327,203; 4,341,889; 4,486,577; 4,605,712; 4,543,398; 4,661,575; 4,703,097; 4,837,289;

4,954,586; 4,954,587; 5,346,946; 5,358,995; 5,387,632; 5,451,617; 5,486,579; 5,962,548; 5,981,615; 5,981,675; and 6,039,913; and combinations thereof. They may also be made using polysiloxane macromers incorporating hydrophilic monomers such as those described in U.S. Pat. Nos. 5,010,141; 5,057,578; 5,314,960; 5,371,147 and 5,336,797; or macromers comprising polydimethylsiloxane blocks and polyether blocks such as those described in U.S. Pat. Nos. 4,871,785 and 5,034,461. All of the cited patents are hereby incorporated in their entireties by reference.

Suitable materials also may be made from combinations of oxyperm and ionoperm components such as is described in U.S. Pat. Nos. 5,760,100; 5,776,999; 5,789,461; 5,807,944; 5,965,631 and 5,958,440. Hydrophilic monomers may be incorporated into such copolymers, including 2-hydroxyethyl methacrylate ("HEMA"), 2-hydroxyethyl acrylate, N,N-dimethylacrylamide ("DMA"), N-vinylpyrrolidone, 2-vinyl-4,4'-dimethyl-2-oxazolin-5-one, methacrylic acid, and 2-hydroxyethyl methacrylamide. Additional siloxane monomers may be incorporated such as tris(trimethylsiloxy) silylpropyl methacrylate, or the siloxane monomers described in U.S. Pat. Nos. 5,998,498; 3,808,178; 4,139,513; 5,070,215; 5,710,302; 5,714,557 and 5,908,906. They may also include various toughening agents, UV blockers, and wetting agents. They can be made using diluents such as primary alcohols, or the secondary or tertiary alcohols described in U.S. Pat. No. 6,020,445. All of the cited patents are hereby incorporated in their entireties by reference.

The materials for making the contact lenses are well known and commercially available. Preferably, the material used is a HEMA based hydrogel, more preferably etafilcon A, and the binding polymer is formed from linear random block copolymers of MAA, and HEMA; linear random block copolymers of MAA and HEMA; linear random block copolymers of HEMA and LMA; or a HEMA homopolymer. Etafilcon A, disclosed in U.S. Pat. Nos. 4,680,336 and 4,495,313 incorporated herein in their entireties by reference, generally is a formulation of 100 parts by weight ("pbw") HEMA, about 1.5 to about 2.5 pbw MAA, approximately 0.3 to about 1.3 pbw ethylene glycol dimethacrylate, about 0.05 to about 1.5 pbw 1,1,1-trimethylolpropane trimethacrylate, and about 0.017 to about 0.024 pbw of a visibility tint. Preferably etafilcon A is used with a linear random block copolymer of MAA and HEMA in a ratio of 0.47 MAA to 100 HEMA, or with a linear random block copolymer of HEMA and MAA in a ratio of 99.9 HEMA and 0.1 MAA to 99.5 HEMA and 0.5 MAA.

A preferred method of manufacturing a cosmetic lens is carried out using pad printing as follows. A metal plate, preferably made from steel and more preferably from stainless steel, is covered with a photo resist material that is capable of becoming water insoluble once cured. The pattern for the additive composition is selected or designed. For example, the pattern may be a limbal ring pattern or a pattern that covers part or all of the iris but does not cover the portion of the eye effecting vision. The final overall pattern will then be reduced to the desired size using any of a number of techniques such as photographic techniques, placed over the metal plate, and the photo resist material is cured. Following the curing, the plate is subsequently washed with an aqueous solution and the resulting image is etched into the plate to a suitable depth, for example about 20 microns. Conditions for carrying out the pattern etching are within the knowledge of one ordinarily skilled in the art.

The sparkle additive composition is then deposited onto the pattern to fill the depressions with sparkle additive composition. The use of the word "pattern" or "design" in the above description refers to the layout of additive composition applied to the lens. However, wherever such a pattern or design will be used, the application of the additives in the additive composition to the pattern or design area will be random. That is, the pattern or design that is formed and used in printing onto the front curve of the lens is a random distribution of additives. A silicon pad of a suitable geometry and varying hardness, generally about 1 to about 10 Shore A durometer units, is pressed against the image on the plate to remove the sparkle additive composition and the sparkle additive composition may then dry slightly by evaporation of the solvent. The pad is then pressed against the molding surface of an optical mold and the sparkle additive composition is allowed to dry.

The sparkle additive composition is applied to all or a portion of the molding surface of the mold. Typically, the sparkle additive composition is applied to that portion of the surface that will be used to mold the portion of the lens that will overlay the lens wearer's iris but not any portion of the eye affecting vision. The application may be carried out by any convenient means. Preferably, the application is carried out by pad printing. In the event molds containing printed patterns are stored for later use in the production of lenses said molds can be conditioned with heat and nitrogen to remove excess solvents and oxygen prior to their use in lens production.

A lens-forming amount of a lens material then is dispensed into the mold. By "lens-forming amount" is meant an amount sufficient to produce a lens of the size and thickness desired. Typically, about 10 to about 75, preferably about 50 to about 75 mg of lens material is used. By "lens material" is meant the monomer or monomers that, when cured, form the lens. The lens material may include any of a wide variety of additives including, without limitation, initiators, ultraviolet absorbers, and the like and combinations thereof.

Following the diffusion of the lens material into the additive composition, the lens material and additive composition are cured under conditions suitable to form the tinted lens. The precise conditions for curing will depend upon the components of the additive composition and lens material selected and are within the skill of one of ordinary skill in the art to determine. In a preferred embodiment, a visible light cure is used at room air and at an elevated temperature of about 70 to about 85° C. In this embodiment, curing takes from about 75 to about 240 seconds. Once curing is completed, the lens is released from the mold and any uncured monomers and or dilutes are leached from the lens. The lens is then equilibrated in a buffered saline solution.

The invention will be clarified further by consideration of the following, non-limiting examples.

EXAMPLES

Example 1

Binding Polymer Synthesis

A binding polymer was made using 96 g of 1-dodecanethiol ("DODT"), 56.54 g lauryl methacrylate ("LMA"), 7.40 g methacrylic acid ("MAA"), 1367 g of hydroxyethylmethacrylate ("HEMA"), 68.5 g glycerol, 378 g 1-ethoxy-2-propanol ("EP"), 1511 g isopropyl lactate ("IPL") and 8.89 g 2,2'-azobis(2-methylbutyronitrile) ("AMBN"). First adding the DODT, monomers and solvents, except for about 50-100 cc of the IPL, were mixed in a 5 liter blue cap bottle and stirred for 10 minutes. The mixture was then poured into a 5 L stainless steel reactor with stirrer and nitrogen. The mixture was stirred and heated for approximately 25 min. until the temperature was 68° C. After the temperature was stabilized at 68° C., the AMBN was dissolved in the remaining IPL and added while opening the nitrogen bleed. The polymerization was allowed to proceed for 16-24 hours after which the temperature was increased to 80° C. and the reaction was completed. The mixture was then allowed to equilibrate to room temperature. The viscosity of the mixture was adjusted as desired by mixing 4 parts of IPL with 1 part of EP.

Sparkle Additive Composition Preparation:

Sparkle additive compositions containing 140 g of the binding polymer, HELICONE® jade colored cholesteric particles and 6 wt percent 1-propanol were prepared. The weight percent of the particle used for various compositions were 3.3, 6.1, and 8.9 wt percent based on the total weight of the additive composition (including binder, cholesteric particle additive, and solvent). Three formulations of each of the 3.3, 6.1 and 8.9 wt percent of sparkle additive formulations were prepared using particle size averages of 18, 24 and 35 μm, respectively. A formulation using a particle size of >35 μm was prepared using a particle weight percent of 3.3.

Contact Lens Fabrication & Various Testing:

The front curve of a polystyrene optical mold was first printed with a 15 μm clear layer, which was composed of the binding polymer described above. A random pattern using each of the additive compositions/formulations was pad printed onto the front curve molding surface of a polystyrene optical mold. Some lenses of each sparkle additive composition/formulation were single printed and some were double printed with a design. The mold was printed in a nitrogen enclosure having <0.5% oxygen after which the mold was filled with a lens-forming amount of etafilcon A. A complementary mold half was then used to complete the mold assembly.

The mold assembly was placed onto a belt that then passed through a cure tunnel comprised of a dark zone and a curing zone that was equipped with lamps emitting a wavelength of 370 to 440 nm. The mold assembly passed into the first stage of the tunnel, also referred to as the dark zone in which no bulbs were present, but in which heaters heated the air to between 55 and 75° C. to maintain the mold temperature at or above the colorant sparkle additive Tg. The mold passed through the bulb and dark zone of the tunnel at a speed so that it remained in this zone for about 75 seconds during which time the Tg temperature was maintained by a continuous feedback system that monitored the mold environment temperature. The mold then exited the dark zone and entered the curing zone, which contained bulbs emitting a wavelength of 370 to 440 nm. The intensity output of each bulb was maintained by a microprocessor based temperature controller. The curing of the lens material was initiated and completed. Once curing was completed, the lens was removed from the mold and any uncured monomers or dilutes were leached from the lens. The lens was then was released from the mold and equilibrated in a buffered saline solution.

The base curves for between 4 and 15 lenses made from each formulation were measured. The average base curve was measured using a Panametrics ultrasonic measurement system in which each lens is placed onto a pedestal and the return time is measured for an ultrasonic signal reflected from the lens base curve over a known diameter to measure the surface sag. For the formulations using the 24 and 35 μm sized particles that were double printed, the average base curves were found to be out of the specification of 8.50 mm±0.2 mm.

The highest concentrated lenses from each particle size were submitted for toxicity analysis for systemic toxicity, ocular irritation and cytotoxicity. The results showed that the lenses were non-toxic, non-irritating and non-cytotoxic.

The lenses were then placed on prosthetic eyes, one having a light blue and a dark brown iris. Each eye was constructed from an acrylic substrate and had an average corneal radius of approximately 7.8 mm. The eye also had an artificial, painted iris about 3-4 mm from the surface. Visual observation by a single observer using a magnifier of approximately 3× power and at a distance of 40 cm or less under ambient lighting showed that, as concentrations and particle size increased, the resulting sparkle effect increased. Larger particles, increased concentration, or both were more visible on the light blue iris than smaller particles and lower concentrations.

Additionally noted was that the 3.3 wt percent formulation of the >35 um particle size distribution did not have an observable sparkle effect. It is believed that the sparkle effect was not observable due to the process—not the sparkle additive nor the sparkle additive composition. The pad printing process, with the 20 micron additive cliché, most likely did not result in an even print distribution and the particles could have been redistributed around the outer diameter of the print area or removed from the 20 micron cliché used to transfer the sparkle additive composition.

Example 2

A sparkle additive composition containing 271.50 g of the binding polymer described in Example 1, 8.9 wt % HELICONE® jade colored pigment (based on the weight of the total sparkle additive composition) of a 24 μm particle size distribution and 6 wt % of 1-propanol was prepared. The front curve of a polystyrene optical mold was first printed with a 15 μm clear layer, which layer was composed of the binding polymer set forth hereinabove. A single or double layer of a 20 μm thick pattern was pad printed onto the front curve molding surface of a polystyrene optical mold.

Contact Lens Fabrication:

The mold was degassed for at least 8 hours to remove excess solvents and oxygen after which the mold was placed onto a belt and filled with a lens-forming amount of etafilcon A. A complementary mold half was used to complete the mold assembly.

The mold assembly was passed through a cure tunnel. The mold passed through the pre-cure, dark zone of the tunnel at a speed so that it remained in this zone for about 240 secs. The tunnel was equipped with heaters to heat the air to between 75 and 85° C. The mold assembly then passed into a dark zone in which no bulbs were on, but in which heaters heated the air to between 75 and 85° C. for an additional 240 secs. The mold then exited the dark zone and entered the curing zone, which contained bulbs emitting a wavelength of 370 to 440 nm and in which heaters heated the air to between 75 and 85° C. The mold was in this heated, lighted zone for 240 sec at which time the curing was completed. The lens was released from the mold, any uncured monomers and/or dilutes were leached from the lens, and the lens was then equilibrated in a buffered saline solution.

Example 3

A sparkle additive composition containing 149 g of the binding polymer described in Example 1, 0.9 wt % Jade Helicone particles based on the weight of the total sparkle additive composition and 6 wt % 1-propanol was prepared for each of the three different particle size distributions 18, 24, and 35 um. Lenses were fabricated as in Example 2 (Contact Lens Fabrication section). The lenses were placed on a dark brown prosthetic eye, as described in Example 1. Through visual observations, 0.9 wt % was determined to be the lowest concentration that resulted in a desired sparkle effect for 18 and 24 um particle size Helicones. The Jade 35 um Helicone particles were remade at a concentration of 0.5 wt % relative to the total sparkle additive composition and manufactured as described above. Lenses were analyzed on a dark brown prosthetic eye. A concentration of 0.48 wt % relative to the total sparkle additive composition was the minimum concentration for the 35 um particle size Helicones to result in a desired sparkle effect.

Example 4

A sparkle additive composition containing up to 135, 120 and 105 g of the binding polymer described in Example 1; 9.4, 18.9, and 28.3 wt %, respectively, Jade Helicone particles based on the weight of the total sparkle additive composition and 6 wt % 1-propanol was prepared for each of the three different particle size distributions 18, 24, and 35 um, respectively. Lenses were fabricated as in Example 2 (Contact Lens Fabrication section). Initial target weight percents were 40, 50 and 65 in clear (with 6, 20, 40 wt % 1-propanol respectively). Concentrations relative to the total of all components were 38, 42 and 46 wt %, respectively. The target 40 and 50 wt % had flow while the target 65 wt % had no flow but was wetted. Higher concentrations around 85 wt % Helicone in binding polymer required increased solvent concentrations to create a wetted ink with flow such that the resulting concentrations were closer to 50 wt %. Jade 18 um Helicone particles at 45 wt % in clear (only) and 50 wt % in 1-propanol (only) resulted in wetted particles.

Maximum processable concentrations relative to the total pad printing ink composition were actual 46 wt % for the 18 and 24 um particles and actual 44 wt % for the 35 um particles.

Example 5

A sparkle additive composition containing 135 g of the binding polymer described in Example 1, 9.4 wt % Jade Helicone particles based on the weight of the total sparkle additive composition and 6 wt % 1-propanol was prepared for each of the three different particle size distributions 18, 24, and 35 um. Lenses were fabricated as in Example 2 (Contact Lens Fabrication section) using clichés of 20 and 30 um depth. The lenses were placed on a dark brown prosthetic eye, as described in Example 1. Through visual observations, the 30 um depth cliché resulted in a lens whose printed region appeared more dense for each particle size.

The lenses above were manufactured using a clear layer of 15 um depth. The 9.4 wt % Jade Helicone 24 um particles at 20 and 30 um depth were also manufactured using a 30 um depth clear layer. Through visual observations, there were no changes in appearance when increasing from a 15 to 30 um clear layer.

Increasing the depth of the cliché for the Helicone print increased the density of the effect and increasing the depth of the clear layer had no impact on the effect.

Example 6

A sparkle additive composition containing 135 g of the binding polymer described in Example 1, 9.4 wt % Jade Helicone particles based on the weight of the total sparkle additive composition and 6 wt % 1-propanol was prepared for each of the three different particle size distributions 18, 24, and 35 um. Lenses were fabricated as in Example 2 (Contact Lens Fabrication section) but two different patterned clichés of 20 um depth each. One cliché design extended to but did not include the pupil region (donut-like in pattern) and the other included a limbal ring as (an annular band of color that, when the lens is on-eye and centered, partially or substantially completely overlies the lens wearer's limbal region, or the junction of the sclera with the cornea). The lenses were placed on a dark brown prosthetic eye, described in Example 1. Through visual observations, the effect was visible and similar in all printed regions.

Example 7

An additive composition in containing 120 g binding polymer described in Example 1, 18.9 wt % Jade 18 um distribution Helicone particles based on the weight of the total additive composition and 6 wt % 1-propanol was prepared. Lenses were fabricated as in Example 2 (Contact Lens Fabrication section) but used three different clichés. Each cliché contained a single dot, a dot cluster of 5 and a dot cluster of 10 etched onto the surface. Each cliché differed in the size of the dot diameters. Size of the dot diameters were 200, 400 and 600 um, respectively, and all were at a 20 um depth. The lenses were placed on a dark brown and light blue prosthetic eye, as described in Example 1. Through visual observations, the distinguish ability of the dots decreased as the size and number of dots in the cluster decreased. All dots were more visible on the dark brown prosthetic eye than on the light blue. Single dots were visible >200 um and all dot clusters >(and equal to) 200 um.

Example 8

A sparkle additive composition containing 135 g of the binding polymer described in Example 1, 8.8 wt % Jade 24 um distribution Helicone particles based on the weight of the total sparkle additive composition, and 15% (relative to the weight of the Helicone) of a white pigment composition (made of 30 wt % $TiO_2$ in binding polymer as described in Example 1) and 6 wt % 1-propanol was prepared. Lenses were fabricated as in Example 2 (Contact Lens Fabrication section). The resulting lenses had an observable sparkle effect.

Example 9

Sparkle additive compositions were prepared by adding approximately 0.5 wt % 24 um distribution Jade Helicone particles to Etafilcon A, disclosed in U.S. Pat. Nos. 4,680,336 and 4,495,313 and narafilcon A disclosed in U.S. Pat. Nos. 6,270,218; 6,367,929; 6,822,016; 6,943,203; 5,697,495; and 6,054,090. The reactive monomer mixes containing cholesteric liquid crystal additives were left on a roller over night. Lenses were manufactured on a small scale using a glove box filled with nitrogen (<0.5 wt % oxygen) and at a temperature of 50 to 65 degrees. Front curve plastic molds were dosed with approximately 100 uL of reactive monomer mix, back curve plastic molds were then placed on top of the front curves and a weight was added. The weights were removed and the assembly was then placed under UV lamps and allowed to cure for 10 or 25 minutes for etafilcon A and narafilcon A, respectively. The assembly was then placed in a saline packing solution at 90 degrees. Back curves were removed and lenses were released in aqueous solution. Through visual observations, the sparkle effect was visible and similar in both materials.

Example 10

Contact lenses from Example 2 were placed on eye for a qualitative evaluation of the effect. Two lens lots were involved in the clinical study: a single layer and double layer. Four groups total were involved in the study. All groups were Caucasian. The four groups were divided as: (1) ages 18-20 with light eyes, (2) ages 21-25 with light eyes, (3) ages 18-20 with hazel eyes, and (4) ages 21-25 with hazel eyes. The words used by the participants to describe the resulting on-eye effect were glittery, twinkly, pixie dust, brightening/lightning, sparkly, luminescent, moist, fresh and alert.

Example 11

An additive composition containing 105 g of binding polymer described in example 1, 28.3 wt % Jade 18 um distribution Helicone particles based on the weight of the total sparkle additive composition and 6 wt % 1-propanol was prepared. Lenses were fabricated as in Example 2 (Contact Lens Fabrication section) except that lenses were packaged in borate buffered saline containing 440 ppm PVP (K90 poly-N-vinylpyrrolidone).

Example 12

An additive composition containing 80 wt % (240.0 g) of a silicone hydrogel binding polymer was combined to form a 20 wt % (60.0 g) HELICONE® jade colored additive composition of a 24 mm particle size distribution. The silicone hydrogel is described in Example 3 of U.S. Patent Application 61/040,880 in the name of Johnson & Johnson Vision Care, Inc., the entire specification of which is incorporated herein by reference. A 50:50 solution of 1-Ethoxy-2-Propanol and 200 proof Ethanol was added to the mixture until a viscosity of 1000 cP was achieved using a Brookfield digital viscometer, spindle 18 at 25° C.

The lens fabrication process was the same as that of Example 2 except that the dark zone pre-cure was 60 seconds and unheated and the cure was 544 seconds with temperatures between 60 and 70° C.

The resulting lenses had an observable sparkle effect.

Example 13

An additive composition containing 135 or 120 g of binding polymer (described in Example 1), 10 or 20 wt %, respectively Jade, Maple, and Titanium Helicone particles based on the weight of binding polymer was prepared. Two different particle sizes (18 and 35 micron) for each formulation were fabricated. Lenses were fabricated as in Example 2 (Contact Lens Fabrication section) but two different patterned clichés for the sparkle additive composition transfer were used. These two clichés included one with a high and one with a low area coverage. Description of the contact lens parameters for each lot produced are listed in Table 1.

Example 14

The lenses described in Example 13 were analyzed to determine the sparkle count, sparkle density ($\rho$), and sparkle randomness factor ($k_{sp}$). Particle sizes of 18, 24 and 35 microns with weight percents are listed in Table 1. Additionally, the lenses described in Examples 3 and 4 were analyzed to determine the sparkle count, sparkle density ($\rho$), and sparkle randomness factor ($k_{sp}$).

Sparkle counts were obtained as follows:

A high resolution CCD camera was affixed to a stabilized platform. The CCD camera was at a distance of 97+/−3 mm with the zoom on its lowest setting. The lenses were placed on a lens holder that is curved (with all air bubbles between the contact and the lens holder eliminated and all folds, wrinkles, or other features that may cause glare or shadows removed). The lenses were periodically moistened throughout the process with artificial tear solution (Prestige Brand Sterile Artificial Tears Lubricant Eye props). Ambient light was reduced as much as possible. Ten images of the lens with light cast upon it are taken by rotating 30°±/−5° between pictures and moistening with artificial tears as needed. Exposure time was 600 ms. The lens and lens holder was illuminated with a light source (DC-950 Fiber Lite, produced by Dolan-Jenner Industries of 159 Swanson Road, Boxborough, Mass.) together with a light collimating attachment and a right handed polarizer. These were stabilized in a fixed position at an angle of 20 degrees to the lens so that light is cast on it with an intensity of 2,500-3,000 Lux. The light source was at a distance of 135 mm from the lens in the lens holder. Sparkle count was counted in the images obtained from the camera. The sparkle count was determined using ImagePro 8 software (commercially available from Media Cybernetics, Bethesda, Md., by: a) resizing the image to 15%, b) converting to 16-bit grayscale image twice, c) applying a "despeckle" filter to one gray image, d) selecting the remaining image and performing a background subtraction to subtract the despeckled image from the remaining gray image, e) engaging the "count" function (with the threshold set to "manual" with range "10,000-65,535"), f) removing any obvious bad points, such as glare in the pupil area or stray points outside of the printed contact, g) recording the number of counted objects. This was repeated on the remaining 9 more images and the average sparkle count was obtained. The average sparkle count is listed in Table 1.

The sparkle density ($\rho$) was obtained by dividing the sparkle count (obtained as above) by the total area count. Area count was determined with ImagePro 8 software (commercially available from Media Cybernetics, Bethesda, Md.) by using the Manual Bright Objects and adjusting lower range value until pattern features are counted as one bright object and then using "Area" measurement in Measurement menu. The sparkle density ($\rho$) is listed in Table 1.

The randomness factor ($k_{sp}$) was obtained as follows:

One of the 10 images (measured as above in sparkle count determination) was selected as a representative image and (a) converted to 16-bit grayscale, (b) the FFT function was engaged (via pressing the icon, selecting "Amplitude" (floating pt.), setting the spectrum gain to 15, selecting "Forward" and applying "FFT", (c) saving the image (FFT image), (d) selecting FFT image as the active and selecting "Contrast Enhancement" from the Enhance menu tab, (e) selecting "Quarter Tone" under "Curve Type" menu, (f) setting contrast slider to 100, (g) opening count menu, (h) setting range from "130 to 255" under "Manual Bright Objects", (i) selecting "Center X" and "Center Y" under "Measurements Menu", (j) identifying the center object and the furthest bright points; (k) finding distance between "Center X" and "Center Y" values, (l) selecting FFT image as active image and selecting "Surface Plot" from the "Measure" tab, (m) setting elevation to zero, (n) rotating the image so that the largest (if any) intensity peaks that are symmetric about the center peak are clearly visible, (o) selecting "New Image" form the "Output" tab, (p) determining the inflection point of the peaks on the image that marked the baseline for measuring, (q) setting image calibration to "none", (r) measuring the height of the peaks using the measure tool, (s) dividing the values of any side peaks by that of the central peak, (t) randomness factor ($k_{sp}$)=1−(height of side peaks divided by height of central peak). The randomness factor ($k_{sp}$) is listed in Table 1.

TABLE 1

Average sparkle count, sparkle density (ρ) and randomness factor ($k_{sp}$) values.

| Sample Description | Sparkle Count | ρ | $k_{sp}$ |
|---|---|---|---|
| Example 13, High Area Jade, 35 um, 20 wt % | 691.1 | 8.48 | 0.94 |
| Example 13, High Area Titanium, 18 um, 20% | 696.4 | 8.54 | 0.99 |
| Example 13, Low Area Maple, 18 um, 10 wt % | 48.9 | 4.08 | 0.91 |
| Example 13, Low Area Titanium, 18 um, 10 wt % | 67.9 | 5.66 | 0.9 |
| Example 13, High Area Maple, 18 um, 20 wt % | 695.2 | 8.53 | N/M |
| Example 13, Low Area Titanium, 18 um, 10 wt % | 65.9 | 5.49 | N/M |
| Example 13, Low Area Titanium, 18 um, 20 wt % | 100.7 | 8.39 | N/M |
| Example 13, Low Area Jade, 18 um, 20 wt % | 119.2 | 9.93 | N/M |
| Example 13, High Area Maple, 35 um, 10 wt % | 356.3 | 4.37 | N/M |
| Example 13, High Area Titanium, 18 um, 10 wt % | 481.8 | 5.91 | N/M |
| Example 13, High Area Jade, 18 um, 10 wt % | 618.6 | 7.59 | 0.96 |
| Example 13, Low Area Jade, 35 um, 10 wt % | 79.8 | 6.65 | 0.94 |
| Example 13, Low Area Titanium, 35 um, 20 wt % | 90.2 | 7.52 | 0.95 |
| Example 13, High Area Titanium, 35 um, 10 wt % | 366 | 4.49 | 0.98 |
| Example 13, High Area Titanium, 35 um, 10 wt % | 584 | 7.17 | 1.0 |
| Example 13, Low Area Maple, 35 um, 20 wt % | 83.4 | 6.95 | 0.96 |
| Example 3 Jade, 24 um, 1 wt % | 30.7 | 0.46 | 0.97 |
| Example 3 Jade, 18 um, 1 wt % | 42.5 | 0.66 | 0.92 |
| Example 3 Jade, 35 um, 1 wt % | 38.5 | 0.71 | 1 |
| Example 4 Jade, 18 um, 65 wt % | 702.2 | 8.21 | 1 |
| Example 4 Jade, 24 um, 65 wt % | 726.7 | 7.94 | 0.9 |
| Example 4 Jade, 35 um, 65 wt % | 493.2 | 7.27 | 0.97 |
| Example 3 Jade, 35 um, 0.5 wt % | 33 | 0.53 | N/A |
| Ciba Vision Freshlook Radiance Contact Lens "Autumn" Brand | 0 | 0 | 0.5 |
| Ciba Vision Freshlook Radiance Contact Lens "Eden" Brand | 0 | 0 | 0.55 |

Example 15

Commercial lenses (manufactured by CibaVision under the product name of "Ciba Vision Freshlook Radiance Contact Lens", "Eden" and "Autumn" product descriptors) containing mica were also tested for sparkle count, sparkle density (ρ) and randomness factor ($k_{sp}$) as per Example 14. Results are listed in Table 1 (see "Eden" and "Autumn" rows in Table 1).

What is claimed is:

1. A contact lens comprising cholesteric liquid crystal particles with sparkle density (ρ) greater than 0.5, a degree of randomness ($k_{sp}$) greater than 0.55 and exhibiting sparkle.

2. The lens of claim 1 comprising polyHEMA.

3. The lens of claim 1 comprising a silicone hydrogel.

4. The lens of claim 1 comprising a sparkle additive in which cholesteric liquid crystal particles are present at about 0.5 to about 50 percent based on the total weight of the sparkle additives.

5. The lens of claim 4, further comprising one or more organic or inorganic pigments.

6. The lens of claim 4 wherein the particles range having an average size from 4 to 70 um.

7. The lens of claim 4 wherein the particles range having an average size from 18 to 35 microns.

8. The lens of claim 4 wherein the sparkle additive is combined with a binding polymer to form a sparkle additive compound and said sparkle additive comprise 0.2-30 wt % (based on the total weight of sparkle additive compound).

9. The lens of claim 4 having sparkle additive in the portion of the lens that covers the iris when worn on-eye and wherein said sparkle additive does not interfere with vision.

10. The lens of claim of claim 9 wherein sparkle additives are not in the area of the lens to be placed over the pupil.

11. The lens of claim 9 having a limbal ring that is accentuated.

12. A method of making a contact lens that exhibits sparkle comprising applying the sparkle additive to a portion of the lens wherein said sparkle additive comprises cholesteric liquid crystal particles such that said lens has sparkle density (ρ) greater than 0.5 and degree of randomness ($k_{sp}$) greater than 0.55.

13. The method of claim 12 wherein a polymer layer is applied to surface of the lens after sparkle additive has been printed on it.

14. The method of claim 12 wherein the sparkle additive is pad printed.

15. The method of claim 12 wherein the sparkle additive is applied by ink jet printing.

16. The method of claim 12 wherein the sparkle additive is in a sparkle additive composition and comprises 0.2-30 wt % (based on the total weight of sparkle additive composition).

17. The method of claim 12 wherein the sparkle additive composition comprises cholesteric particles and binding polymer.

18. The method of claim 12 wherein a portion of the lens is formed and the sparkle additive is printed onto a surface of the lens.

19. The method of claim 18 wherein the particle size is 4 to 70 um, the particles are randomly distributed, and the lens exhibits a ρ greater than 0.5.

* * * * *